May 17, 1960
A. J. MAHER, JR
2,936,951
METHOD AND APPARATUS FOR ACCURATE ANALOG
INTEGRATION OF TIME FUNCTIONS
Filed Dec. 30, 1958
2 Sheets-Sheet 1
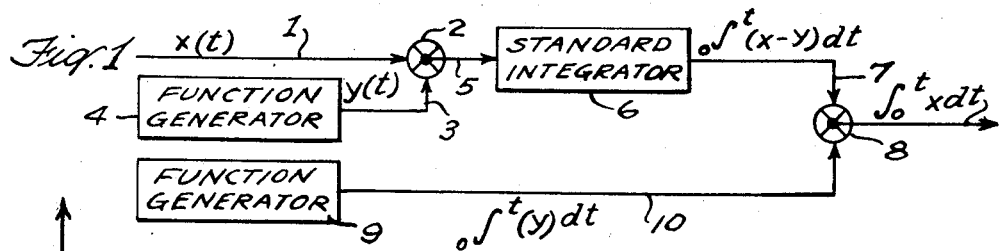
Fig. 1
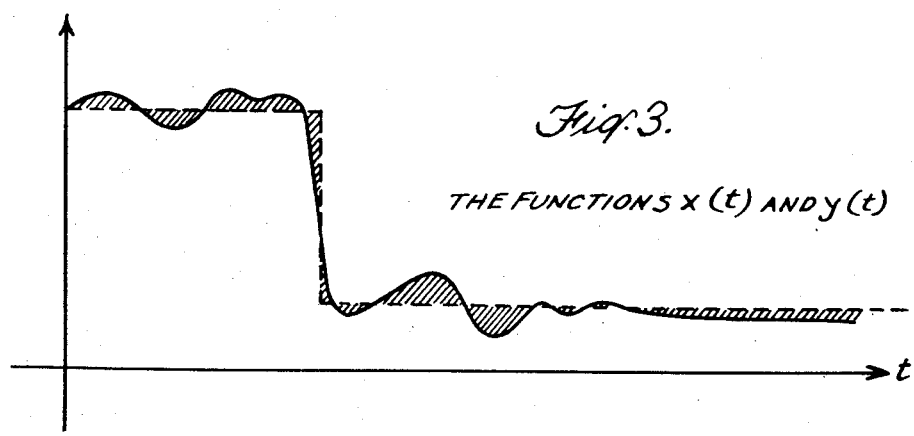
Fig. 2.
THE FUNCTION $x(t)$
Fig. 3.
THE FUNCTIONS $x(t)$ AND $y(t)$
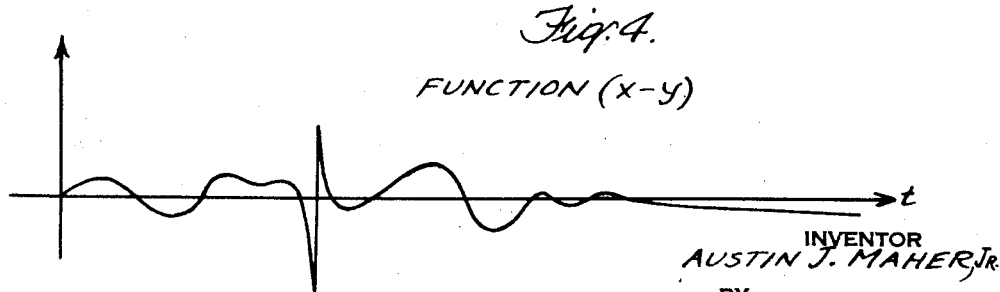
Fig. 4.
FUNCTION $(x-y)$
INVENTOR
AUSTIN J. MAHER, JR.
BY
Borsland Borst
ATTORNEYS May 17, 1960
A. J. MAHER, JR
2,936,951
METHOD AND APPARATUS FOR ACCURATE ANALOG
INTEGRATION OF TIME FUNCTIONS
Filed Dec. 30, 1958
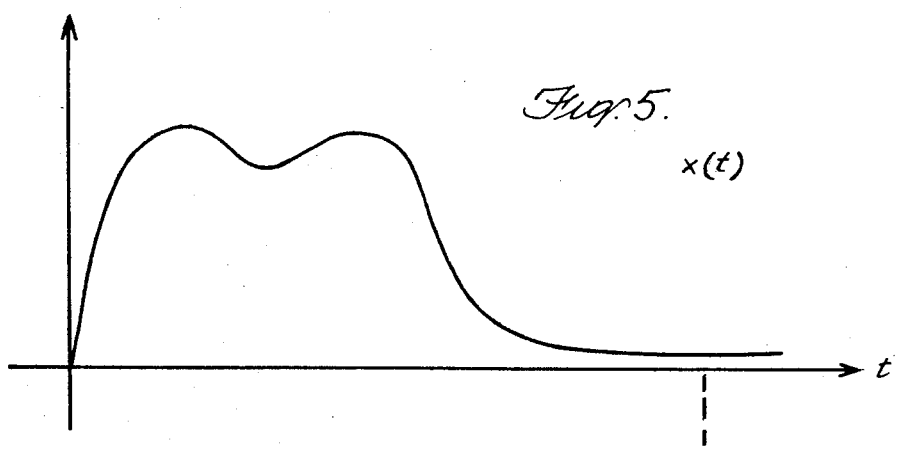
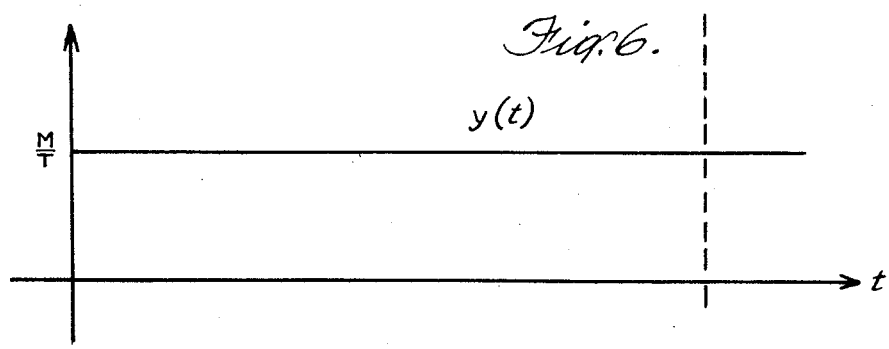
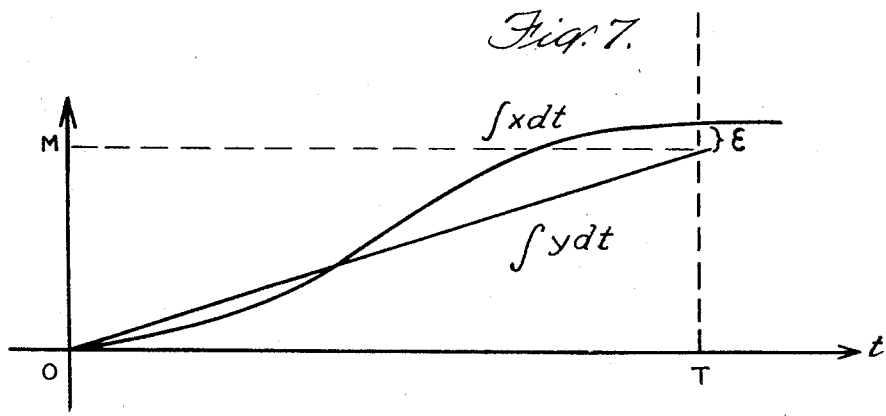
INVENTOR
AUSTIN J. MAHER, JR.
BY
ATTORNEYS United States Patent Office 2,936,951
Patented May 17, 1960

2,936,951

METHOD AND APPARATUS FOR ACCURATE ANALOG INTEGRATION OF TIME FUNCTIONS

Austin J. Maher, Jr., Brooklyn, N.Y., assignor to Sperry Rand Corporation, Ford Instrument Company Division, Wilmington, Del., a corporation of Delaware Application December 30, 1958, Serial No. 783,854

1 Claim. (Cl. 235—61)

This invention relates to an integrating system employing standard mechanical or electrical components which in combination perform accurate analog integration.

It is known that the standard analog integrators employing mechanical or electrical components have inherent errors as well as errors in scale factor over their intended range of operation. According to this invention an integrating system is provided which utilizes common computing components, such as mechanical or electrical function generators, which together with a standard integrator combine to reduce substantially the inherent errors or these errors together with scale factor errors.

An object of the invention is to provide a computing network comprising conventional integrating and other types of computing components which has the capacity to generate accurate integrals of functions that are set into the system.

Other objects and advantages of the invention may be apparent on reading the following detailed description of one embodiment thereof which is taken in conjunction with the accompanying drawing, in which Fig. 1 is a block diagram of the integrating network;
Fig. 2 is a graph of an arbitrary function $x(t)$;
Fig. 3 is a graph of a preselected function $y(t)$ superimposed on graph of function $x(t)$;
Fig. 4 is a graph of a combined function $(x-y)$;
Fig. 5 is a graph of another arbitrary function $x_1(t)$;
Fig. 6 is a graph showing the value of the preselected integral $\int_0^T y(t)dt$;
Fig. 7 is a graph showing the comparison of the arbitrary integral $\int x_1 dt$ and the preselected integral $\int y dt$.

Referring to Fig. 1, a shaft 1 settable in accordance with a function $x(t)$, the integral of which is desired, is connected into one side of the differential 2, the other input side of which is connected by a shaft 3 to a function generator 4 adapted to yield the function $y(t)$.

The output of the differential 2 on shaft 5 is placed into a standard time integrator 6 whose integral output, $\int_0^t (x-y)dt$, on shaft 7 is placed into one side of a second differential 8.

A second function generator 9 is adapted to produce the integral of the function $y(t)$ generated by the function generator 4 and its output $\int_0^t y dt$ is placed into the other side of the differential 8, the output of which is the desired integral $\int_0^t x dt$.

The function generators may take the form of linear potentiometers or mechanical three-dimensional cams and the standard integrator may be an electronic circuit or of the mechanical ball and disc type.

That the desired integral is obtained as the output of the differential 8 may be mathematically demonstrated. Where the added integral inputs to the differential 8 is designated I, its output may be represented as follows:

(1) $I = \int_0^t x(t) - y(t)dt + \int_0^t y(t)dt$

This output can be simplified as follows:

(2) $I = \int_0^t x(t) - y(t)dt + \int_0^t y(t)dt$
(3) $= \int_0^t x(t)dt - \int_0^t y(t)dt + \int_0^t y(t)dt$
(4) $= \int_0^t x(t)dt$ This is, of course, the desired integral. It remains to demonstrate that this system is capable of producing a more accurate integral than an unmodified integrator is capable of producing.

In many integrator applications, the function $x(t)$ is not completely arbitrary. Moreover, it is not unusual to be able to define a function which provides a reasonable prediction of the behavior of $x(t)$. In these cases, choose $y(t)$ to be a function which provides a reasonable approximation to $x(t)$. The accuracy required of this approximation is not stringent (an approximation within 50% of $x$ will provide a measurable increase in integration accuracy) and, therefore, it is possible to choose a function $y(t)$ which may be accurately generated.

In this mode of operation, the standard integrator only operates on the deviation of $x(t)$ from its approximation $y(t)$. The remainder of the integral is accurately generated as $\int_0^t y(t)dt$. Because the output of the standard integrator is only a fraction of the total integral, it contributes much less error than it would have produced in integrating $x(t)$ directly. Since a great deal of freedom is allowed in choosing $y(t)$, it is assumed that a function $y$ will be chosen which permits its integral to be generated with sufficient accuracy to assure a negligible contribution to the error of the system.

An example of this mode of operation is demonstrated graphically in Figures 2, 3 and 4. Assume the function defined by Figure 2 is to be integrated. Since the general form $x(t)$ was known beforehand, $y(t)$ was defined as a combination of step functions which form an approximation to $x(t)$ as shown in Figure 3. Now, the standard integrator need only integrate the difference function $x(t)-y(t)$ shown by Figure 4 (or the shaded area in Figure 3). It is evident that the standard integrator can integrate this function with much more precision than it could integrate $x(t)$ directly and that the addition of a pre-computed integral of $y(t)$ will not appreciably increase the total system error.

The previous mode of operation was based on the assumption that it is possible to make $y(t)$ a crude approximation to $x(t)$ but the value of the invention is not limited to this mode of operation. In many integrator applications it is only necessary to integrate over a certain fixed time interval (say between 0 and T). In addition, the desired integral $\int_0^T x(t)dt$ may only vary slightly from some predetermined value (say M). In this case a new mode of operation is defined in which the function $y(t)$ is chosen such that $\int_0^T y(t)dt = M$.

In this case, the output of the standard integrator at time T is nearly zero because it is only measuring the difference between M and $\int_0^T x(t)dt$. For this reason, a great deal of uncertainty in the value of the output scale factor of the standard integrator may be tolerated without an appreciable decrease in the accuracy of the integrating network. A great deal of scale factor uncertainty must be tolerated for some standard integrators. Electronic integration circuits, for example, experience appreciable changes in scale factor during shelf life as a result of variation in the values of certain critical circuit parameters. Therefore, the ability of this invention to remain relatively insensitive to this error is one of its major advantages.

This mode of operation is demonstrated graphically in Figures 5, 6 and 7. As usual, $x(t)$ is the function to be integrated. The choice of the function $y(t)$ was based on only two criteria (see Figure 6), the ease of generation and integration (which dictated a step function) and the integral $\int_0^T y(t)dt$ is equal to a preassigned number, M. In Figure 7 the output of the standard integrator at time T is denoted by $\epsilon$. A percent error in the scale factor of the standard integrator will produce an equivalent percent error in the output ($\epsilon$). If a standard integrator was used without the embodiments as shown by this invention the output would be $(M+\epsilon)$, whereby a percent error in the scale factor would produce an equivalent percent error in the output $(M+\epsilon)$. It is readily seen that the error in the output $(M+\epsilon)$ is considerably greater than the error in the output $(\epsilon)$. Therefore the nominal scale factor of the standard integrator need be restricted only within a large range to assure an accurate integral of $x(t)$ as the output of the network.

It should be noted that these modes of operation may be followed independently and in many cases simultaneously. In addition, the requirement that $y(t)$ and its integral be accurately generated is by no means a serious limitation on the accuracy of the integration network. For example, the great freedom permitted in choosing $y(t)$ in either mode of operation often allows $y$ to be formed by one or more step functions, thereby assuring that its integral consists only of straight line segments. The present state of the art assures that components are available to generate these functions.

What is claimed is:

An integrating system comprising an integrator, a differential unit connected to the input side of said integrator and adapted to receive two inputs, a known function generator connected to one input side of said differential unit, a connection for the other input side of said differential unit adapted to receive the desired function to be integrated, a second differential, a second function generator adapted to yield the integral of the function represented in said known function generator, said second differential unit having one input side connected to receive the output of said second function generator and another input side connected to receive the output of said integrator, whereby said second differential is enabled to yield an accurate integral of the desired function placed in said system for integration.

No references cited.